(12) United States Patent
Knotts

(10) Patent No.: US 6,850,388 B1
(45) Date of Patent: Feb. 1, 2005

(54) APPARATUS AND METHOD FOR FORMING A MAGNETIC FLUID SEAL

(75) Inventor: Ralph James Knotts, Eden Praire, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 358 days.

(21) Appl. No.: 10/072,498

(22) Filed: Feb. 5, 2002

(51) Int. Cl.[7] .............................................. G11B 17/02
(52) U.S. Cl. ................................................ 360/99.08
(58) Field of Search ....................... 360/99.08, 98.07; 277/410; 384/133

(56) References Cited

U.S. PATENT DOCUMENTS

| | | | | |
|---|---|---|---|---|
| 4,890,850 A | * | 1/1990 | Raj et al. ..................... | 277/410 |
| 5,011,165 A | * | 4/1991 | Cap ............................. | 384/133 |
| 5,617,272 A | * | 4/1997 | MacLeod et al. .......... | 360/99.08 |
| 6,558,042 B1 | * | 5/2003 | Tompkins .................... | 384/133 |

* cited by examiner

*Primary Examiner*—Robert S. Tupper
(74) *Attorney, Agent, or Firm*—Raghunath S. Minisandram; Jesus Del Castillo

(57) ABSTRACT

Embodiments of the invention generally provide an apparatus and method for, sealing an outer surface of a shaft to an inner surface of a hub. In one embodiment, the invention provides a magnetic fluid seal held in a gap defined by a top member and a bottom member. In one aspect, the distance from the rotational axis of the shaft to the outer periphery of the lower member is less than the distance between the rotational axis of the shaft and the outer periphery of the upper member. In another aspect, the lower member has a member that slopes between a first radial distance to a second radial distance, relative the rotational axis of the shaft. In another aspect, the member has a stepped region including a first and second region where the first stepped region corresponds to a first radial distance, and the second stepped region corresponds to a second radial distance, relative the rotational axis of the shaft.

20 Claims, 3 Drawing Sheets

APPARATUS AND METHOD FOR FORMING A MAGNETIC FLUID SEAL

BACKGROUND OF THE INVENTION

1. Field of the Invention

The present invention relates generally to the field of disc drives, and more particularly to an apparatus and method for providing a reliable, ferrofluidic seal between a hub and a shaft of a spindle motor in a disc drive.

2. Description of the Related Art

Disc drives are capable of storing large amounts of digital data in a relatively small area. Disc drives store information on one or more recording media. The recording media conventionally takes the form of a circular storage disc, e.g., media, having a plurality of concentric circular recording tracks. A typical disc drive has one or more discs for storing information. This information is written to and read from the discs using read/write heads mounted on actuator arms that are moved from track to track across surfaces of the discs by an actuator mechanism.

Generally, the discs are mounted on a spindle that is turned by a spindle motor to pass the surfaces of the discs under the read/write heads. The spindle motor generally includes a shaft fixed to a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Generally, as the hub rotates, lubricating fluids or greases used in the bearings tend to give off contaminates such as aerosols or vaporous components that may migrate or diffuse out of the spindle motor and into a disc chamber in which the discs are maintained. In addition, the vapor may transport particulate contaminates abraded from the bearings, or other components of the spindle motor, into the disc chamber. The contaminates may be deposited on the read/write heads and the surfaces of the discs, causing damage to the discs and/or the read/write heads as they pass over the discs. To prevent contaminant migration, the spindle motor usually includes a fluidic seal (i.e., ferrofluidic seal) to seal interfacial spaces between the hub and the shaft.

Ferrofluidic seals generally consist of a magnetic fluid, an axially polarized annular magnet, and two magnetically permeable annular pole pieces attached to opposing faces of the magnet. The magnetic fluid is conventionally composed of a suspension of magnetically permeable particles suspended in a fluid carrier. Generally, the magnet and the pole pieces are fixed to the hub and extend close to but do not touch the shaft. Magnetic flux, generated by the magnet, passes through the pole pieces and the shaft, which is also magnetically permeable, to magnetically hold the magnetic fluid in gaps between the pole pieces and the shaft, thereby forming a ferrofluidic seal.

Unfortunately, although this design has worked well for conventional lower rotational speed spindle motors, increased data capacity, along with the demand for faster disc drive information access, has caused the disc drive rotational speeds to increase, often exceeding 13,000 revolutions per minute (rpm). The centrifugal forces developed at such high speeds often exceed the ability of the ferrofluidic seal's magnetic flux to hold the magnetic fluid against the shaft due to the velocity gradient across the magnetic fluid, often resulting in the failure of the ferrofluidic seal. Further, as the rotational speed increases, the centrifugal force exerted on the magnetic fluid of the rapidly rotating ferrofluidic seal increases, thereby increasing the probability of seal failure. In addition, a sufficient centrifugal force on the magnetic fluid during dynamic operations, such as data access, can impair the ferrofluidic seal, causing splashing, and migration of the magnetic fluid, which may lead to contamination of the discs and loss of information storage and retrieval. Therefore, a need exists for a method and apparatus to provide a ferrofluidic seal between a shaft and a hub that is effective and reliable even at high rotational speeds.

SUMMARY OF THE INVENTION

The invention generally provides a method, and apparatus for a ferrofluidic seal. In one embodiment, the invention provides a seal for sealing an outer surface of a magnetically permeable shaft to an inner surface of a hub disposed about the shaft, comprising an annular magnet positioned between the shaft and the hub, a top pole piece having a first end coupled to the annular magnet, and a bottom pole piece having a tapered end. The tapered end tapers from a first radius to a second radius with respect to the shaft, wherein the first end and the tapered end define a gap having a magnetic fluid therein.

In another embodiment, the invention provides a seal for sealing an outer surface of a stationary shaft to an inner surface of a rotating hub disposed about the shaft, comprising at least one annular magnet disposed about the shaft and coupled to at least one stationary upper member. The invention also provides at least one lower member coupled to the rotating hub, wherein the at least one lower member includes at least one surface thereon in a facing relationship to a distal end of the at least one stationary upper member. In addition, Ferrofluid is magnetically held within a gap defined by the at least one surface and the distal end, wherein when the rotating hub is rotated, at least some of the Ferrofluid migrates on the at least one surface from a first radial position to a second radial position, with respect to the shaft.

In another embodiment, the invention provides a method for sealing an outer surface of a shaft to an inner surface of a magnetically permeable hub disposed about the shaft. The method includes providing an upper member from the shaft and a lower member from the magnetically permeable hub, then providing at least one surface on the lower member that is in a facing relationship to a distal end of the upper member, rotating the magnetically permeable hub, and then establishing a centrifugal force gradient within a magnetic fluid disposed on the at least one surface. The centrifugal force gradient is developed when the hub is rotating so that at least some of the magnetic fluid migrates from a first radial position to a second radial position thereon, with respect to the shaft.

BRIEF DESCRIPTION OF THE DRAWINGS

So that the manner in which the above recited embodiments of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
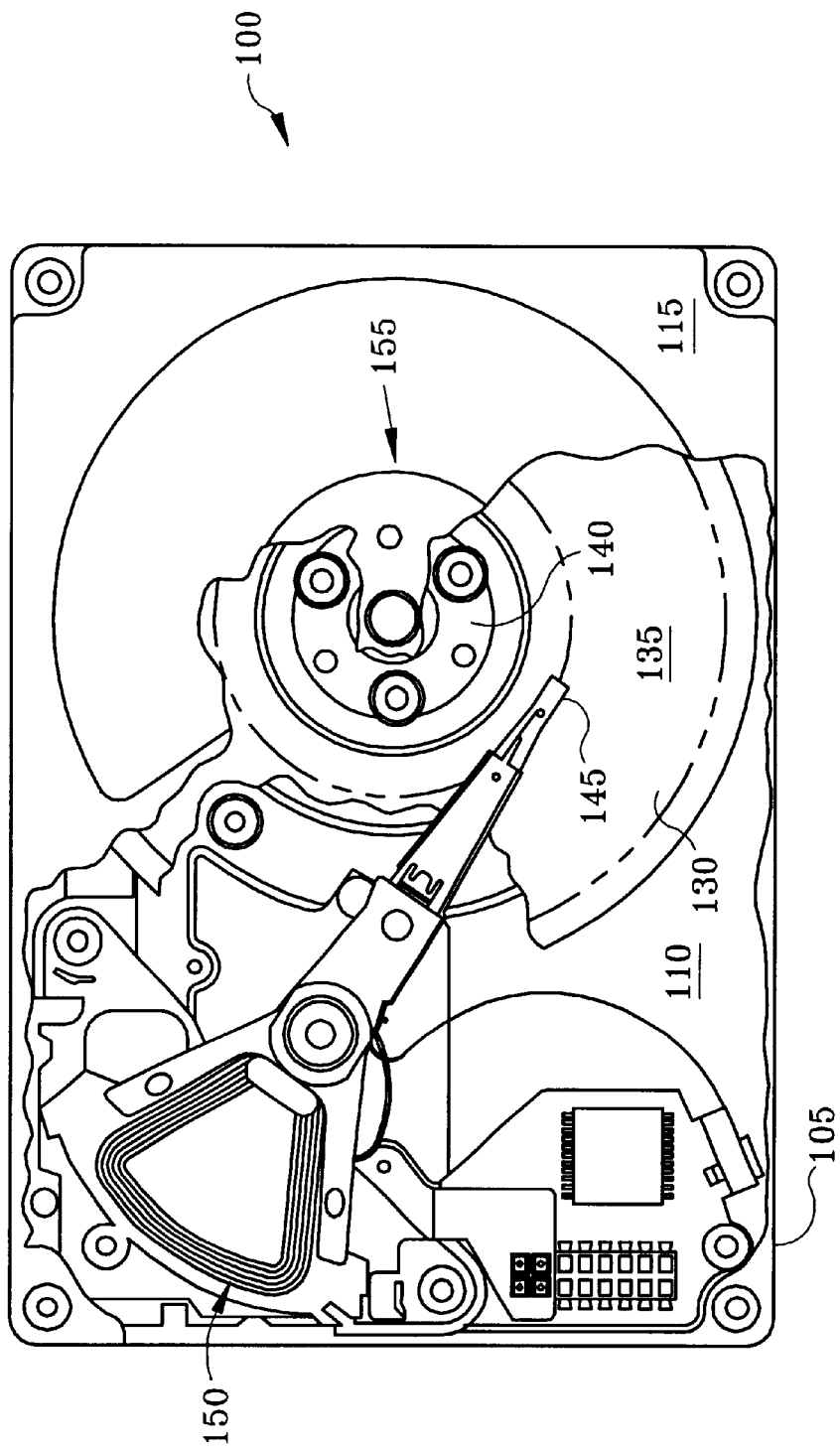
FIG. 1 depicts a plan view of one embodiment of a disc drive for use with aspects the invention.

FIG. 1 depicts a plan view of one embodiment of a disc drive for use with embodiments of the invention. Referring to FIG. 1, a disc drive 100 typically includes a housing 105 having a base 110 joined to a cover 115. One or more of discs 130 having surfaces 135 covered with a magnetic media (not shown) for magnetically storing information are attached to a spindle 140. A spindle motor 155 (See, FIG. 2) turns the spindle 140 to rotate the discs 130 past read/write heads 145 which are suspended above surfaces 135 of the discs by a suspension arm assembly 150. In operation, the discs 130 are rotated at high speed past the read/write heads 145 while the suspension arm assembly 150 moves the read/write heads in an arc over a number of radially spaced tracks (not shown) on the surfaces 135 of the discs 130. Thus, enabling the read/write heads 145 to read and write magnetically encoded information to the magnetic media on the surfaces 135 of the discs 130 at selected locations.

Figure 2:
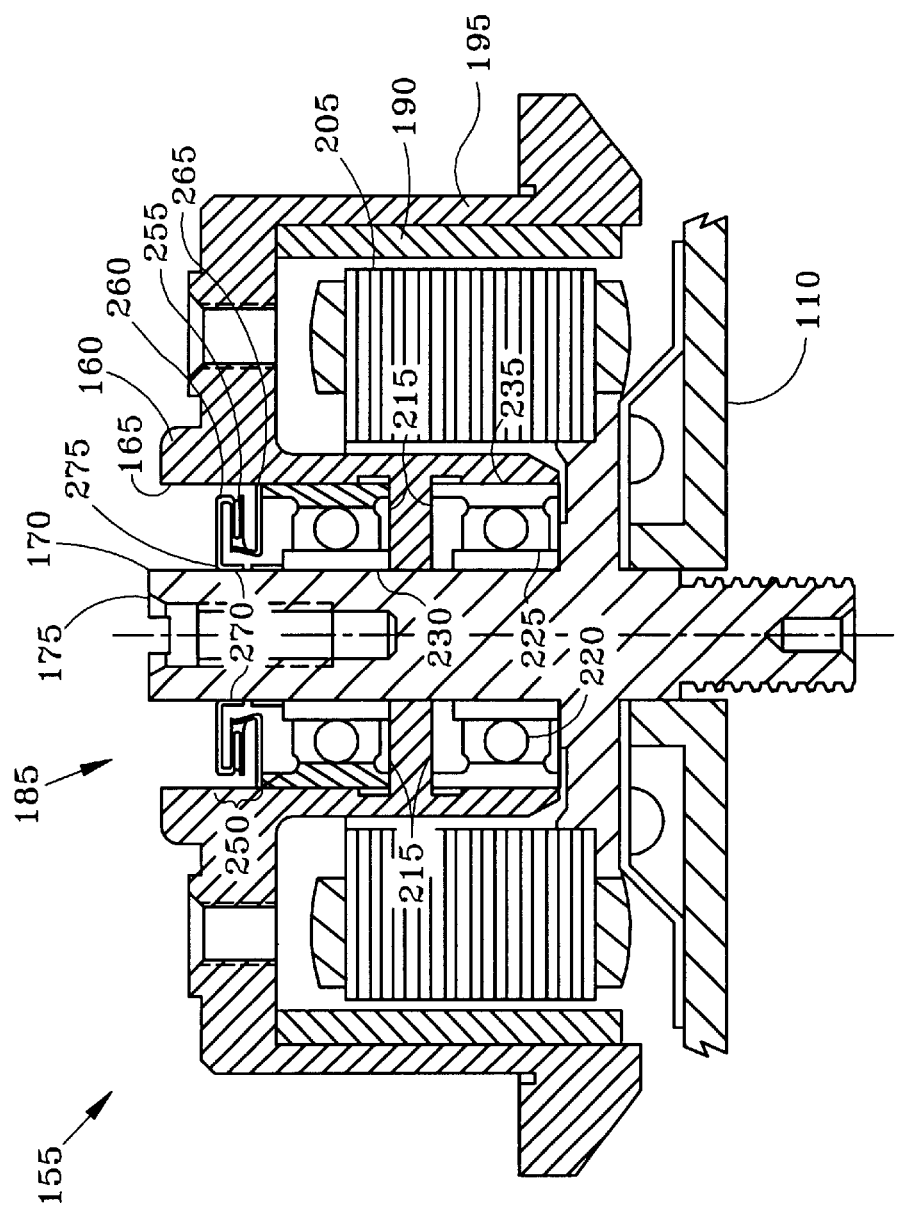
FIG. 2 is a sectional side view depicting one embodiment of a spindle motor for use with aspects of the invention.

FIG. 2 is a sectional side view depicting one embodiment of a spindle motor 155 for use with aspects of the invention. The spindle motor 155 may include a rotatable hub 160 having an inner surface 165 disposed about an outer surface 170 of a shaft 175. In one aspect, a ferrofluidic seal 185 seals the outer surface 170 of the shaft 175 to the inner surface 165 of the hub 160. The ferrofluidic seal 185 includes a top and bottom pole piece 260, 265 and a laminate 250 that includes an annular magnet 255. The top and bottom pole pieces 260, 265 are formed of a rigid material such as steel, or other materials that are magnetically permeable. To complete the ferrofluidic seal 185, a magnetic fluid (e.g., Ferrofluid) 270 is magnetically held in a gap 275 between the pole pieces 260, 265 and the annular magnet 255, to fluidly seal the shaft 175 to the hub 160. In one aspect, the magnetic fluid 270 includes ferromagnetic particles such as $FeO_3$ a magnetite, colloidally suspended in a carrier fluid, such as a hydrocarbon or synthetic ester based fluid. The ferrofluidic seal 185 is described below in more detail with reference to FIGS. 3 and 4.

In one embodiment, as illustrated in FIG. 2, one or more magnets 190 attached to a periphery 195 of the hub 160 interact with a stator winding 205 attached to the base 110 to cause the hub 150 to rotate. The hub 160 is supported on the shaft 175 by one or more bearings 215, such as fluid dynamic bearings (not shown) or ball bearings 215 as shown in FIG. 2. The ball bearings 215 generally include one or more balls 220 loosely held by a retainer 225 between an inner race 230 and an outer race 235. Interfacial spaces (not shown) between the balls 220, the retainer 225, and the inner and outer races 230,235, may be filled with a lubricating fluid or grease to facilitate movement of the balls 220. In another aspect, the fluidic seal 185 may be adapted to maintain a hermetic seal between the outer surface 170 of the shaft 175 and the inner surface 165 of the hub 160 so that the fluid, grease and other loose particles associated with the bearing 215 are prevented from migrating to the discs 130.

Figure 3:
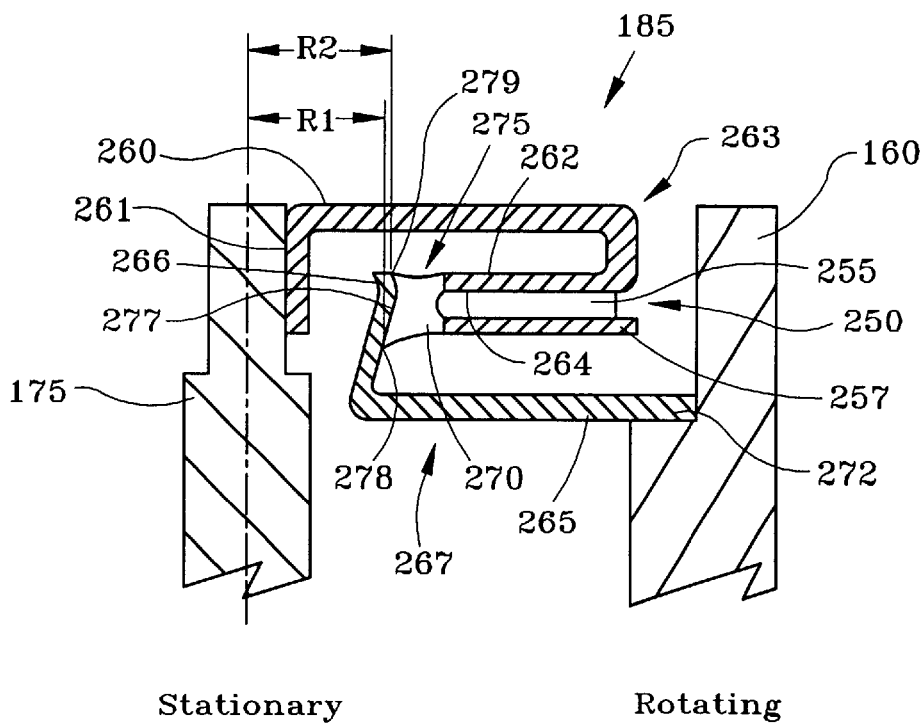
FIG. 3 depicts a partial sectional side view of one embodiment of a ferrofluidic seal.

FIG. 3 depicts a partial sectional side view of one embodiment of a ferrofluidic seal 185. The top pole piece 260 may be attached on a shaft end 261 to the shaft 175 using conventional adhesives, or may be formed integral thereto. The top pole piece 260 generally extends laterally from the shaft 175 a distance between the shaft 175 and the hub 160. A distal end 262 of the top pole piece 260 bends back toward the shaft 175 to form an upper J-member 263. In one aspect, the upper J-member 263 includes an upper surface 264 that is bonded or otherwise adhesively coupled to an upper surface of the annular magnet 255 to support the annular magnet 255 thereon. In another aspect, the annular magnet 255 may be coupled to a lower annular member 257 forming the laminate 250 therebetween. The bottom pole piece 265 may be fixedly attached on a hub end 267 to the hub 160 using conventional adhesives, or may be formed integral thereto. The bottom pole piece 265 may be adhesively attached on a hub end 272 and extends laterally from the hub 160 a distance between the shaft 175 and the hub 160. A distal end 266 of the bottom pole piece 265 bends upwardly, and generally back toward the hub 160 forming a lower J-member 267. In another aspect, to minimize the rotational speed (i.e., velocity) of the distal end 266 of the bottom pole piece 265 with respect to the shaft 175, the distal end 266 of the bottom pole piece 265 has a smaller radial distance from the longitudinal axis of the shaft 175 than the distal end 262 of the top pole piece 260.

To form the gap 275, a tapered region 277 of the distal end 266 of the bottom pole piece 265 tapers relative to the distal end 262 of the top pole piece 260 and the annular magnet 255, arid is spaced therefrom in a facing relationship. Generally, the magnetic fluid 270 when subjected to a slower rotational or static state is held within the gap 275 by surface tension developed on an upper surface of the magnetic fluid 270. The surface tension keeps the magnetic fluid 270 from migrating down the lower J-member 267. However, as the hub 160, and therefore, the bottom pole piece 265 are rotated about the shaft 175, centrifugal forces are developed within the magnetic fluid 270. In one aspect, an exemplar ferrofluidic seal 185 is provided by positioning a lower end 278 of the tapered region 277 at a first radius R1, i.e., a first radial position, that is smaller than a second radius R2, i.e., a second radial position, of an upper end 279 of the of the tapered region 277, with respect to the longitudinal axis of the shaft 175. In one aspect, the egress of the magnetic fluid 270 from the tapered region 277 is prevented by providing a gradient of the centrifugal forces developed within the magnetic fluid 270 extending from a lower centrifugal force adjacent the lower end 278 to a higher centrifugal force adjacent the upper end 279. For example, as the first radius R1 is shorter in length than the second radius R2, the linear velocity of the lower end 278 with respect to the longitudinal axis of the shaft 175, increases in a gradient from a lower linear velocity to a greater linear velocity at the upper end 279. Therefore, the centrifugal force of the magnetic fluid 270 adjacent the upper end 279 is greater than the centrifugal force of the magnetic fluid 270 adjacent the lower end 278. The greater centrifugal force gradient forces the magnetic fluid 270 toward the upper end 279 thereby preventing the magnetic fluid 270 from migrating down the lower J-member 267 and away from the tapered region 277. Thus, egress of the magnetic fluid 270 may be prevented by providing a tapered region 277 of the lower J-member 267 creating a centrifugal force gradient in an opposite direction of a magnetic fluid egress path away from the tapered region 277.

Figure 4:
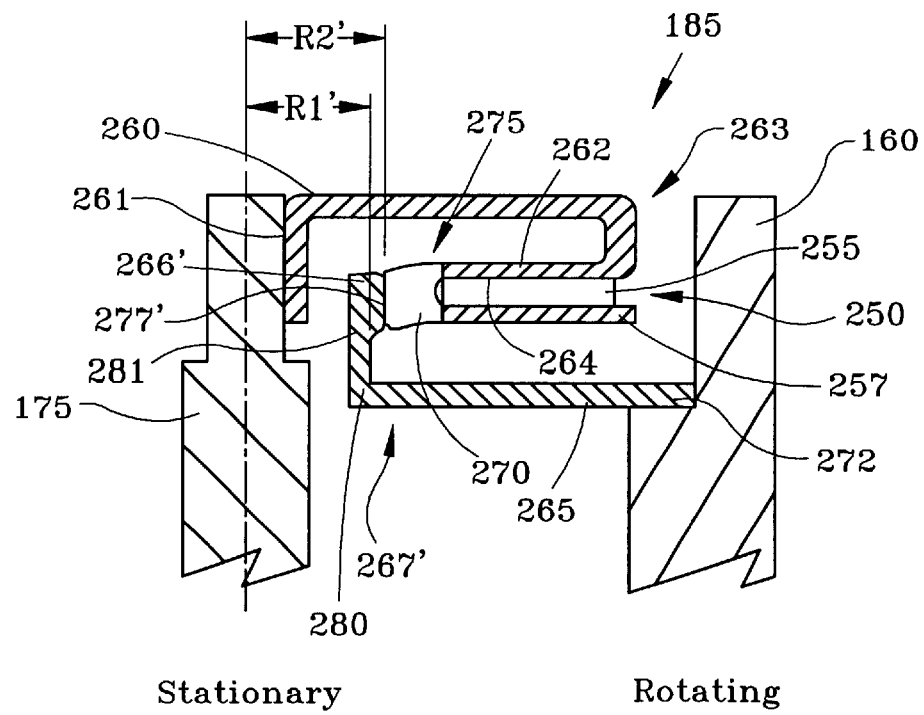
FIG. 4 depicts a partial sectional side view of one embodiment of a ferrofluidic seal.

FIG. 4 depicts a partial sectional side view of another embodiment of the ferrofluidic seal 185. In one aspect, the egress of the magnetic fluid 270 away from the gap 275 is prevented by providing a distal end 266' of a lower J-member 267' that includes a lower region 280 and an upper region 281 having a sealing surface 277' thereon. The migration of the magnetic fluid 270 is prevented by establishing a first radius R1', i.e., a first radial position, of the lower region 280 that is smaller than a second radius R2', i.e., a second radial position, of an upper region 281 with respect to the longitudinal axis of the shaft 175, thereby providing a stepped lesser and greater centrifugal force, respectively, within the magnetic fluid 270. The magnetic fluid migration may be prevented by constraining the magnetic fluid 270 to the upper region 281 on the sealing surface 277' by providing a sufficient centrifugal force differential (i.e., centrifugal force step change) between the upper and lower region 280–281 thereby preventing the magnetic fluid 270 from migrating away from the gap 275. Thus, as the linear velocity of the upper region 281 is greater than linear velocity of the lower region 280, the magnetic fluid 270 positioned within the lower region 280 would be forced to move up on the sealing surface 277' of the upper region 281. In an alternative configuration, the lower region 280 may be tapered toward the upper region 281 allowing the magnetic fluid 270 to migrate more easily to the upper region 281 and on the sealing surface 277'.

While the foregoing is directed to embodiments of the invention, other and further embodiments of the invention may be devised without departing from the basic scope thereof, and the scope thereof is determined by the claims that follow.

What is claimed is:

1. A seal for sealing an outer surface of a magnetically permeable shaft to an inner surface of a hub disposed about the shaft, comprising:
   an annular magnet positioned between the shaft and the hub;
   a top pole piece having a first end coupled to the annular magnet; and
   a bottom pole piece having a tapered end that tapers from a first radius to a second radius with respect to the shaft, wherein the first end and the tapered end define a gap having a magnetic fluid therein.

2. The seal of claim 1, wherein the tapered end is in a facing relationship to the first end.

3. The seal of claim 1, wherein the first end is positioned further from the shaft than the tapered end.

4. The seal of claim 1, wherein the tapered end comprises a sealing region between the first radius and the second radius.

5. The seal of claim 1, wherein the top pole piece comprises a first member extending from the shaft and a distal end that curves toward the shaft.

6. The seal of claim 5, wherein the top pole piece is about J-shaped.

7. The seal of claim 1, wherein the bottom pole piece comprises a first member extending from the hub and a distal end that curves toward the hub.

8. The seal of claim 7, wherein the bottom pole piece is about J-shaped.

9. A disc drive having a seal for sealing an outer surface of a stationary shaft to an inner surface of a rotating hub disposed about the shaft, comprising:
   at least one annular magnet disposed about the shaft and coupled to at least one stationary upper member;
   at least one lower member coupled to the rotating hub, wherein the at least one lower member includes at least one surface thereon in a facing relationship to a distal end of the at least one stationary upper member; and
   ferrofluid magnetically held within a gap defined by the at least one surface and the distal end, wherein when the rotating hub is rotated, at least some of the ferrofluid migrates on the at least one surface from a first position to a second position with respect to the shaft.

10. The disc drive of claim 9, wherein the at least one surface of the at least one lower member is positioned closer to the shaft than the distal end of the at least one stationary upper member.

11. The disc drive of claim 9, wherein the at least one lower member comprises a cross-sectional area that is about J-shaped.

12. The disc drive of claim 9, wherein the at least one stationary upper member comprises a cross-sectional area that is about J-shaped.

13. The disc drive of claim 9, wherein the at least one surface of the at least one lower member is tapered so that the greater the rotation of the rotating hub, the further at least some of the ferrofluid migrates from the first position to the second position.

14. The disc drive of claim 13, wherein the at least one surface includes a tapered portion defined by a lower portion tapering to an upper portion wherein the lower portion corresponds to about the first position and the upper portion corresponds to about the second position.

15. The disc drive of claim 9, wherein the at least one surface is stepped so that a first region of the at least one surface corresponds about to the first position and a second region of the at least one surface corresponds to abput the second position.

16. The disc drive of claim 15, wherein the first region has a greater circumferential rotation distance about the shaft than the second region.

17. An apparatus for sealing a stationary member to a rotating member rotating relative to the stationary member in a disc drive, comprising:
   magnetic sealing means comprising an upper member coupled to one of the stationary member or the rotating member and a lower member coupled to the other of the stationary member or the rotating member; and
   means establishing a centrifugal force gradient within a magnetic fluid disposed on at least one surface of the upper and lower members so that magnetic fluid migration from a first position to a second position with respect to the stationary is controlled.

18. The apparatus of claim 17, wherein a first surface on the lower member comprises a first portion and a second portion wherein the first portion is disposed further inward radially than the second portion and the gradient is established between the first portion and the second portion.

19. The apparatus of claim 17, wherein means for establishing the centrifugal force gradient comprises tapering the at least one surface.

20. The apparatus of claim 19, wherein tapering the at least one surface comprises tapering the at least one surface from a first point to a second point wherein the first point is disposed further inward radially than the second point.

* * * * *